US007839864B1

(12) United States Patent
Satrawla et al.

(10) Patent No.: US 7,839,864 B1
(45) Date of Patent: Nov. 23, 2010

(54) PRIORITY PROPAGATION WITH A HIERARCHICAL ASYNCHRONOUS TRANSFER MODE (ATM) SCHEDULER

(75) Inventors: Varun Satrawla, San Jose, CA (US); Mark Gustlin, Campbell, CA (US); Robert Olsen, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 433 days.

(21) Appl. No.: 11/751,496

(22) Filed: May 21, 2007

(51) Int. Cl.
*H04L 12/28* (2006.01)

(52) U.S. Cl. .................................. 370/395.42; 370/412

(58) Field of Classification Search .............. 370/395.1, 370/397, 395.42, 412
See application file for complete search history.

(56) References Cited

U.S. PATENT DOCUMENTS

| 5,859,835 | A * | 1/1999 | Varma et al. ................. 370/229 |
| 6,301,269 | B1 | 10/2001 | Tayloe et al. |
| 6,359,861 | B1 * | 3/2002 | Sui et al. ..................... 370/230 |
| 6,438,135 | B1 * | 8/2002 | Tzeng ......................... 370/412 |
| 6,510,158 | B1 * | 1/2003 | Robotham et al. ........... 370/399 |
| 6,683,879 | B1 * | 1/2004 | Kado ......................... 370/395.4 |
| 6,754,215 | B1 * | 6/2004 | Arikawa et al. ............ 370/395.4 |
| 6,999,453 | B1 * | 2/2006 | Chemla et al. ............... 370/389 |
| 7,061,927 | B2 * | 6/2006 | Panigrahy et al. ........... 370/419 |
| 7,106,745 | B2 * | 9/2006 | Kusumoto .............. 370/395.41 |
| 7,215,678 | B1 * | 5/2007 | Ahlfors et al. ............... 370/412 |
| 7,417,999 | B1 | 8/2008 | Charny |
| 7,450,503 | B1 * | 11/2008 | Ginjpalli et al. ........... 370/230.1 |
| 2004/0042420 | A1 * | 3/2004 | Agarwal et al. ........... 370/310.1 |
| 2005/0226263 | A1 * | 10/2005 | Panigrahy et al. ........... 370/419 |

OTHER PUBLICATIONS

Lizzi et al., "A Real-time IPC Service over ATM Networks for the Chorus Distributed Systems", IEEE, 1998.

* cited by examiner

*Primary Examiner*—Andrew Lee
(74) *Attorney, Agent, or Firm*—Weaver Austin Villeneuve and Sampson LLP (57) ABSTRACT

According to various embodiments, high priority traffic is obtained from one of a plurality of virtual channels servicing high priority traffic. High priority traffic is placed in a high priority queue. Low priority traffic is obtained from one of a plurality of virtual channels. A weighting value associated with an element in the active queue is determined. The element corresponds to a virtual channel associated with the low priority traffic. The low priority traffic is placed either in a low priority traffic active queue or a low priority traffic pending queue based on the weighting value.

20 Claims, 6 Drawing Sheets

PRIORITY PROPAGATION WITH A HIERARCHICAL ASYNCHRONOUS TRANSFER MODE (ATM) SCHEDULER

TECHNICAL FIELD

The present disclosure relates to priority propagation using hierarchical scheduling at an asynchronous transfer mode (ATM) interface.

DESCRIPTION OF RELATED ART

Asynchronous transfer mode (ATM) interface associated with network devices are configured to propagate traffic based on schemes such as constant bit rate (CBR), variable bit rate (VBR), and unspecified bit rate (UBR). A traffic shaping scheme such as CBR, VBR, or UBR is applied to traffic based on the ATM class of traffic.

However, mechanisms for propagating traffic with priority at an ATM interface are limited. Consequently, it is desirable to provide improved methods and apparatus for priority propagation of traffic at an ATM interface.

BRIEF DESCRIPTION OF THE DRAWINGS

The disclosure may best be understood by reference to the following description taken in conjunction with the accompanying drawings, which illustrate particular example embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular packets and asynchronous transfer mode (ATM) interfaces. However, it should be noted that the techniques of the present invention apply to a variety of cells, packets, and interfaces. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, high priority traffic is obtained from one of a plurality of virtual channels servicing high priority traffic. High priority traffic is placed in a high priority queue. Low priority traffic is obtained from one of a plurality of virtual channels. A weighting value associated with an element in the active queue is determined. The element corresponds to a virtual channel associated with the low priority traffic. The low priority traffic is placed either in a low priority traffic active queue or a low priority traffic pending queue based on the weighting value.

Example Embodiments

Conventional mechanisms for priority propagation at an ATM interface are limited. ATM shaping systems conventionally propagate traffic by separating traffic into different classes. Each class of traffic has a particular shaping policy such as constant bit rate (CBR), variable bit rate (VBR), and unspecified bit rate (UBR). Unfortunately, many systems using ATM including broadband aggregation systems do not support separating traffic by ATM class. Many systems using ATM simply assign a single virtual channel per user/destination. In order to separate traffic into ATM classes, the system needs to use multiple virtual classes for a particular user destination pair. Many systems also simply support a single ATM cell shaper level using just virtual channels or just virtual paths.

With a single level of ATM shaping, it is possible to perform simple priority based deficit round robin (DRR) class queuing on the shaped entity, whether it is a virtual channel or a virtual path. Priority traffic within a given virtual channel is sent ahead of non priority traffic. This provides an effective priority propagation system in many instances, but has significant limitations. For example, when there is congestion at the ATM port level, all virtual channels are slowed down, and eventually the traffic for the virtual channels gets served in a round robin fashion under severe congestion. In this way non priority traffic on one virtual channel can inefficiently use bandwidth from priority traffic on another virtual channel.

These problems become exacerbated when an additional level is added to the shaping system and the entities like virtual paths and ports are highly oversubscribed. Congestion worsens the unfairness problem when you have n levels of ATM shaping. Consequently, various techniques and mechanisms give preference to priority traffic at the different levels of the shaping hierarchy.

According to various embodiments, layer three priority information is evaluated by a cell based priority DRR scheduling mechanism added to a hierarchical ATM cell shaper system. A system gives preference to virtual channels that have priority traffic over virtual channels that do not have priority traffic, when the scheduler system is under congestion and as long as the virtual channel and or virtual path is eligible to send. Under severe congestion, only virtual channels that have priority traffic can send traffic. According to various embodiments, priority traffic is sent at an associated peak cell rate (PCR) or sustainable cell rate (SCR). Low priority traffic shares remaining bandwidth using proportional shares associated with their virtual channel proportional shares.

According to various embodiments, a system uses two cell scheduler scoreboards or calendars in addition to deficit round robin. In particular example embodiments, priority traffic on any virtual channel is transmitted using priority propagation. This allows high priority traffic from any virtual channel to be scheduled ahead of lower priority or low priority traffic. According to various embodiments, a high priority queue is provided to hold priority traffic from any virtual channel. The priority traffic is transmitted when bandwidth becomes available on an output interface.

A system provides proportional and controlled sharing of bandwidth for virtual channels that do not have priority traffic. This allows for preferential treatment of one virtual channel versus another even if a system not carrying priority traffic and more efficiently shares an ATM interface in conditions such as over-subscription.

According to various embodiments, a system queues traffic first by class on per virtual channel class queues. In particular example embodiments, traffic for a particular virtual channel can be placed in a number of queues having different priority levels. Cells from the virtual channel class queues are added to an ATM scoreboard/calendar in an appropriate timeslot based on the virtual channel's future eligibility. When the cell is eligible, it comes off the calendar. If the cell is high priority or from a high priority packet, the cell is placed on a high priority queue. The high priority queue may be associated with a virtual path or port. If the cell is low priority or from a low priority packet, it is placed in a low priority or low priority active or pending queue, depending on a weighting value. Any priority lower than high priority including non priority is referred to herein as low priority. The low priority queue has elements corresponding to each virtual channel. Each element maintains a weighting value or weight so that each virtual channel may be provided with different shares of bandwidth. For example, one virtual channel is assigned a weight of one while another virtual channel is assigned a weight of ten so that differentiation can be applied to low priority traffic.

In particular example embodiments, an active low priority queue is provided with a pending low priority queue. If an associated weight indicates that traffic can no longer be placed in the active low priority queue for a particular virtual channel, the traffic is placed on the pending queue. When the active queue is empty, the pending queue becomes the active queue. Whenever there is traffic on the virtual path queue, a cell is placed onto the virtual path calendar at the appropriate time in the future. The two queues for a given virtual path are serviced in priority order. Once the virtual path's cell comes off of the virtual path calendar then it is sent out the port.

Figure 1:
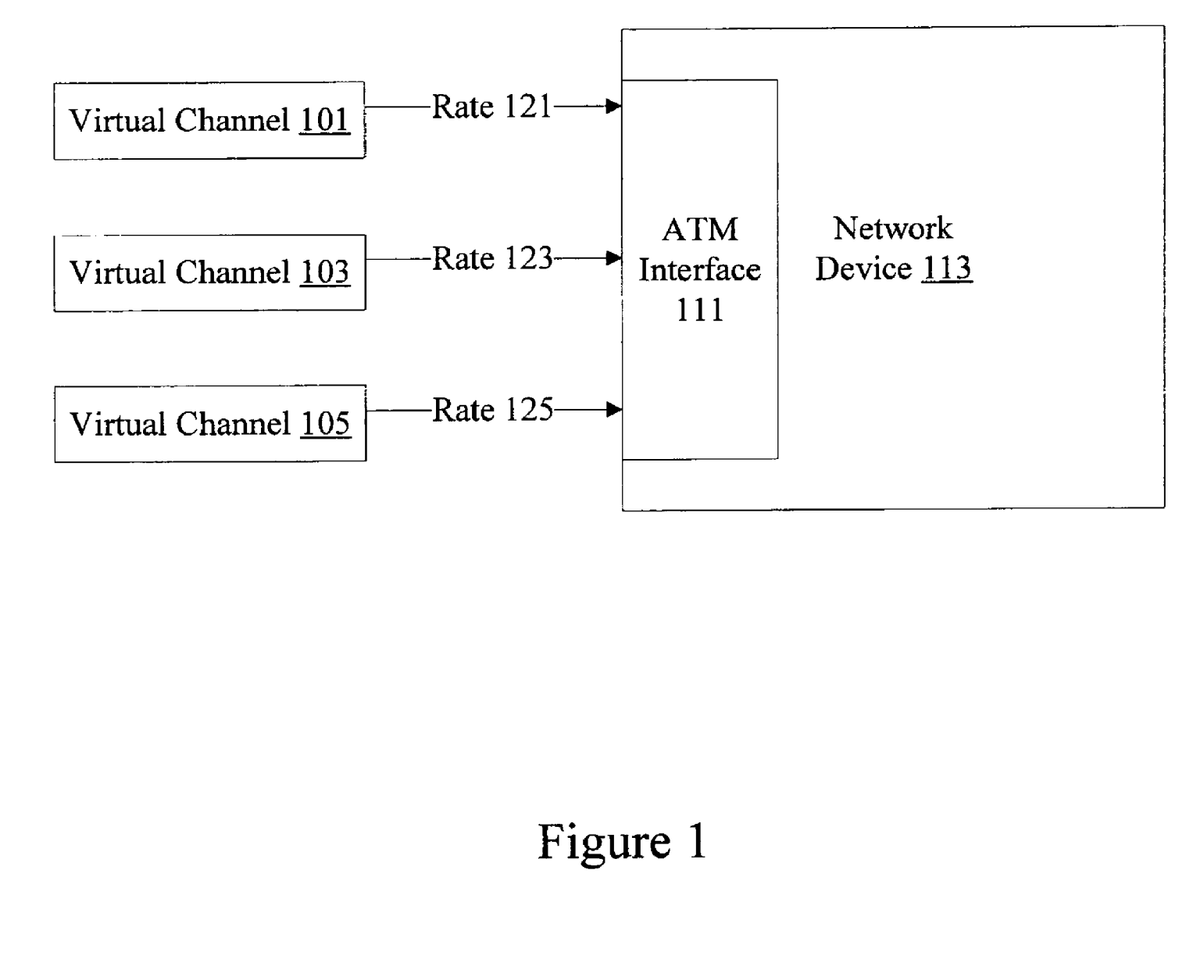
FIG. 1 illustrates a particular example of an asynchronous transfer mode (ATM) interface.

FIG. 1 illustrates a particular example of a network that can use particular example embodiments. Virtual channels 101, 103, and 105 are connected to an ATM interface 111 associated with a network device 113. ATM is a cell based transfer mode. ATM allows multiple logical connections to be multiplexed over a single physical interface. The information flow on each logical connection is organized into cells. In many instances, ATM cells encapsulate other types of data such as Internet Protocol (IP) packets.

Each virtual channel is assigned a particular rate. Virtual channel 101 has an assigned rate 121. Virtual channel 103 has an assigned rate 123. Virtual channel 105 has an assigned rate 125. Virtual channels are logical connections in ATM and is the basic unit of switching in ATM. A virtual channel is set up between two end users through the network and provided with a particular bit-rate. Virtual channels are also used for user/network exchange and network/network exchange.

Virtual channels that have the same source destination pair can be bundled into an entity called virtual paths. The cells flowing over all the virtual channels in a single virtual path are switched together. According to various embodiments, the network device aggregates traffic from virtual channels 101, 103, and 105 prior to transmission on an output interface. In many conventional systems, only a single virtual channel or virtual path is assigned to a particular source/destination pair. Each virtual channel is assigned a particular bit rate and a particular shaping policy such as constant bit rate (CBR), variable bit rate (VBR), and unspecified bit rate (UBR).

According to various embodiments, the ATM interface 111 applies priority based deficit round robin (DRR) class queuing on the shaped entity, whether it is a virtual channel or a virtual path. Priority traffic within a given virtual channel is sent ahead of low priority traffic. In particular example embodiments, the ATM interface 111 transmits in proportion to the rates assigned to each virtual channel 101, 103, and 105. However, when there is congestion at the ATM port level, all virtual channels are slowed, and the traffic for virtual channels 101, 103, and 105 are served in round robin fashion. Low priority traffic on one virtual channel can be sent before priority traffic on another virtual channel.

Figure 2:
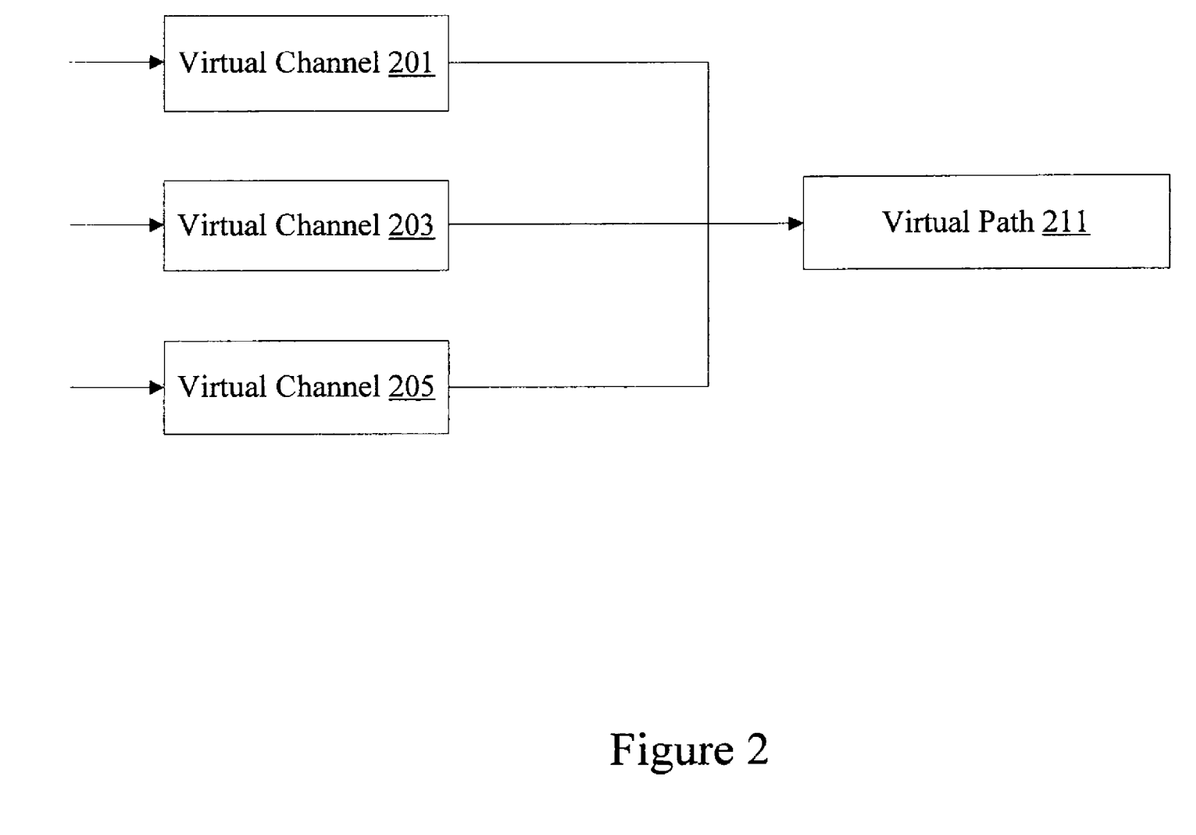
FIG. 2 illustrates a particular example of virtual channels and virtual paths.

FIG. 2 illustrates one example of virtual channels. Virtual channels 201, 203, and 205 are included in virtual path 211. According to various embodiments, virtual path 211 is grouped with other virtual paths in a physical path. In particular example embodiments, virtual channels 201, 203, and 205 have the same source destination pair as virtual path 211. A system network administrator may assign particular rates and rate policies to virtual channels 201, 203, and 205. According to various embodiments, the techniques and mechanisms of the present invention provide priority propagation at an ATM scheduler for a system using virtual channels, virtual paths, or both virtual channels and virtual paths.

According to various embodiments, virtual channel 201 has a bandwidth of 100 kbps, virtual channel 203 has a bandwidth of 50 kbps, virtual channel 205 has a bandwidth of 30 kbps, and virtual path 211 has a bandwidth of 250 kbps. Both virtual channel traffic and virtual path traffic can be shaped.

Figure 3:
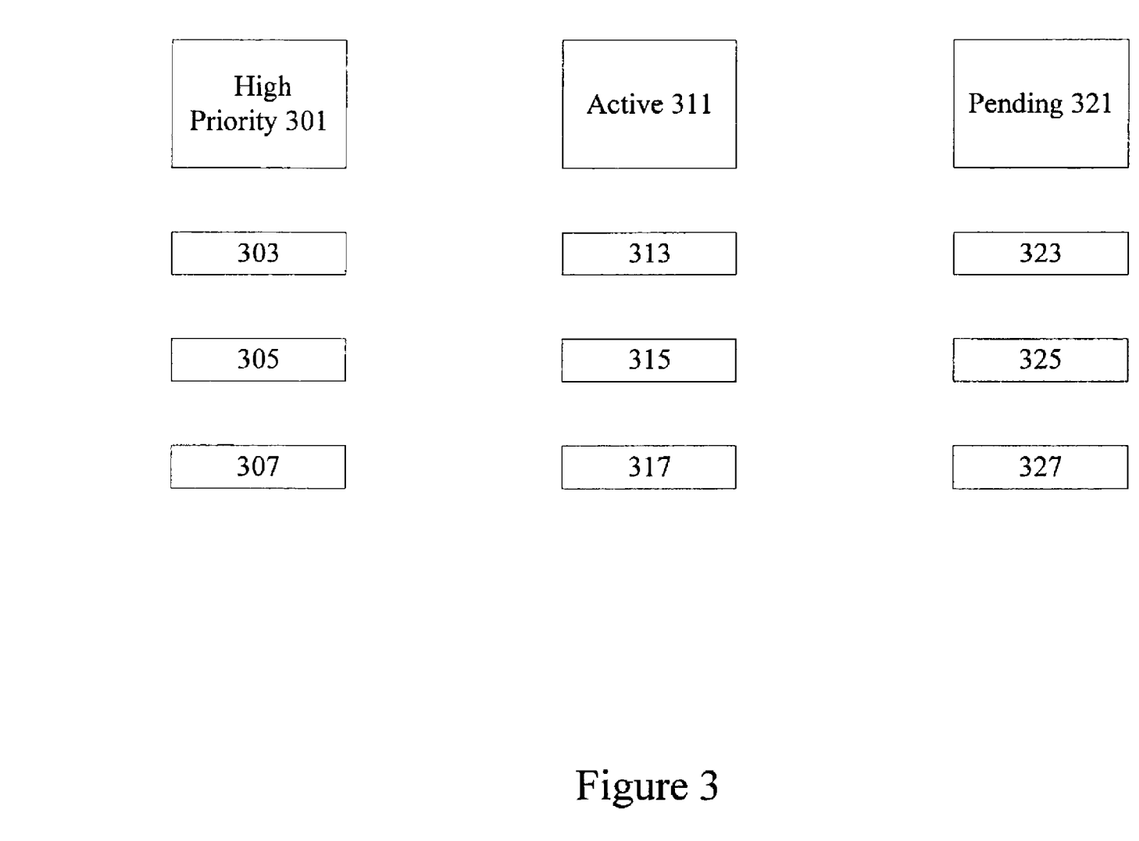
FIG. 3 illustrates a particular example of priority propagation.

FIG. 3 illustrates one example of a system for implementing priority propagation at an ATM interface. According to various embodiments, the system includes a high priority queue 301 that supports high priority traffic under a virtual channel. In particular example embodiments, the high priority queue 301 includes elements 303, 305, and 307. Each element 303, 305, and 307 may correspond to a particular virtual channel. Although a high priority queue 301 having elements 303, 305, and 307 is shown, it should be noted that in some instances, the high priority queue 301 may not be separated into portions. The high priority queue may simply receive any high priority traffic for transmission prior to transmission of low priority traffic.

High priority traffic may be designated using layer 2 and/or layer 3 mechanisms. Active queue 311 includes elements 313, 315, and 317. Elements 313, 315, and 317 may be assigned to virtual channels such as virtual channel A, virtual channel B, and virtual channel C.

According to various embodiments, a system queues traffic first by class on per virtual channel class queues. Cells from the virtual channel class queues are added to an ATM scoreboard/calendar in an appropriate timeslot based on the virtual channel's future eligibility. Once the cell comes off the calendar (and it is therefore now eligible), if it is a cell from a priority packet then it is put on a priority based virtual path such as a high priority queue 301. If it is a cell from a low priority packet then it is placed on a low priority virtual path or port level queue such as active queue 311 or pending queue 321.

According to various embodiments, for a cell in virtual channel A, if the share of bandwidth for element 313 corresponding to virtual channel A of the low priority packet is not exhausted, then the low priority packet is placed in element 313 corresponding to virtual channel A of the low priority packet in the active queue 311. If the share of bandwidth for element 313 corresponding to virtual channel A of the low priority packet is exhausted, the low priority packet is placed in element 323 corresponding to virtual channel A of the low priority packet in the pending queue 323.

According to various embodiments, for a cell in virtual channel A, if the share of bandwidth for element 315 corresponding to virtual channel A of the low priority packet is not exhausted, then the low priority packet is placed in element 315 corresponding to virtual channel A of the low priority packet in the active queue 313. If the share of bandwidth for element 315 corresponding to virtual channel A of the low priority packet is exhausted, the low priority packet is placed in element 325 corresponding to virtual channel A of the low priority packet in the pending queue 325.

According to various embodiments, for a cell in virtual channel A, if the share of bandwidth for element 317 corresponding to virtual channel A of the low priority packet is not exhausted, then the low priority packet is placed in element 317 corresponding to virtual channel A of the low priority packet in the active queue 313. If the share of bandwidth for element 317 corresponding to virtual channel A of the low priority packet is exhausted, the low priority packet is placed in element 327 corresponding to virtual channel A of the low priority packet in the pending queue 327.

A system scheduler takes packets for transmission from high priority queue 301 and in deficit round robin fashion from active queue 311. According to various embodiments, when active queue 311 is empty or all of the weights are exhausted, the pending queue 321 becomes active queue 311 with associated weights refreshed.

According to various embodiments, virtual paths are also supported using a virtual path queue. Whenever there is traffic on the virtual path queue, a cell is placed onto the virtual path calendar at the appropriate time in the future. The two queues for a given virtual path are serviced in priority order. Once the cell from the virtual path comes off of the virtual path calendar, it is sent out the port.

Figure 4:
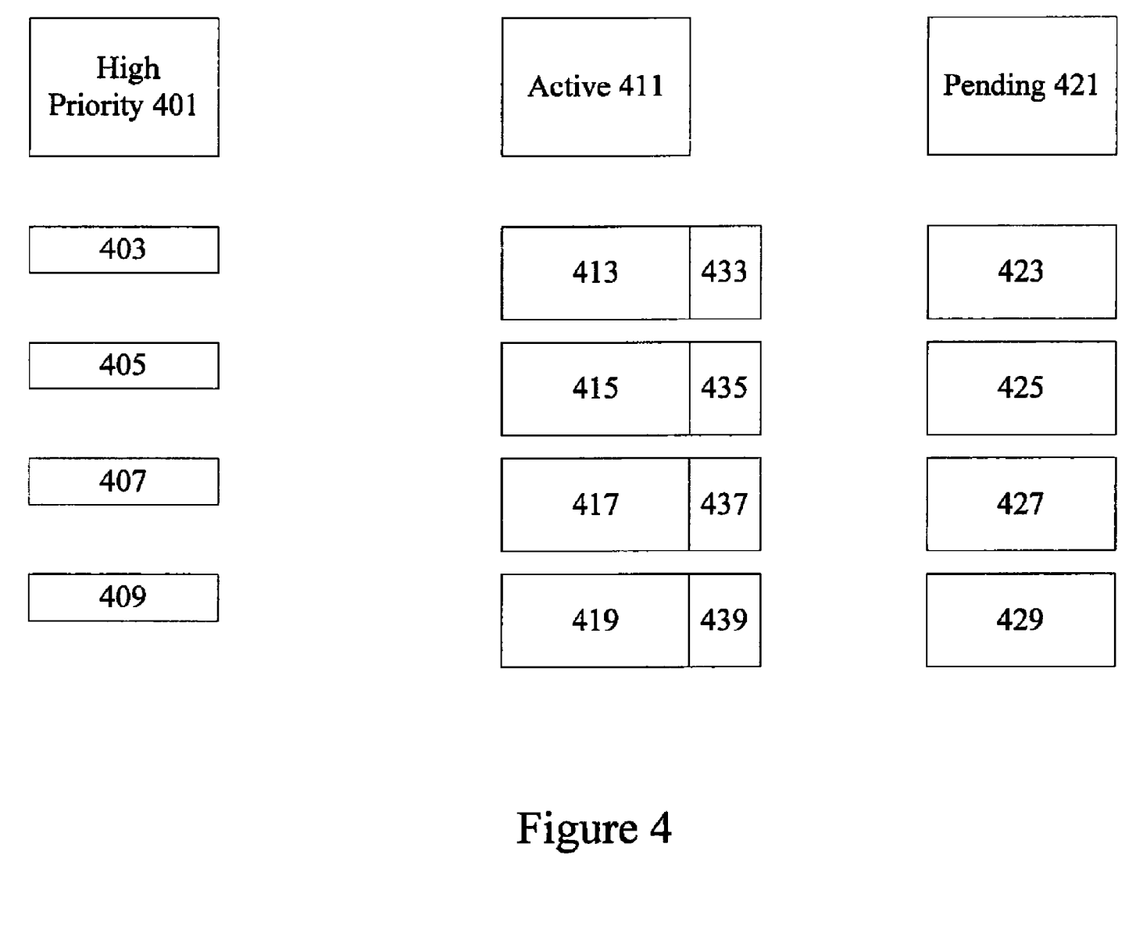
FIG. 4 illustrates a particular example of priority propagation.

FIG. 4 illustrates one example of a system for implementing priority propagation at an ATM interface. According to various embodiments, the system includes a high priority queue 401 that supports high priority traffic under a virtual channel. In particular example embodiments, the high priority queue 401 includes elements 403, 405, 407, and 409. Each element 403, 405, 407, and 409 may correspond to particular virtual channel. The high priority queue may simply receive any high priority traffic for transmission prior to transmission of low priority traffic.

High priority traffic may be designated using layer 2 and/or layer 3 mechanisms. Active queue 411 includes elements 413, 415, 417, 419. Elements 413, 415, 417, and 419 may be assigned to virtual channels such as virtual channel A, virtual channel B, virtual channel C, and virtual channel D. According to various embodiments, elements 413, 415, 417, and 419 have weights or weighting values corresponding to the bandwidths of their associated virtual channels. According to particular embodiments, elements 413, 415, 417, and 419 have weighting values 433, 435, 437, and 439. Some elements may have an associated weight for a large share of bandwidth, while other elements may have an associated weight for a small share of bandwidth.

According to various embodiments, a system queues traffic first by class on per virtual channel class queues. Cells from the virtual channel class queues are added to an ATM scoreboard/calendar in an appropriate timeslot based on the virtual channel's future eligibility. Once the cell comes off the calendar (and it is therefore now eligible), if it is a cell from a priority packet then it is put on a priority queue on an associated virtual path. If it is a cell from a low priority packet, it is placed on a low priority queue on an associated virtual path or port.

According to various embodiments, for a cell in virtual channel A, if there is sufficient weight in the element 413 corresponding to virtual channel A of the low priority packet, the low priority packet is placed in element 413 corresponding to virtual channel A of the low priority packet in the active queue 411. In particular example embodiments, the cell is placed in cell buffer 431, 433, or 435. If there is no longer sufficient weight in the element 413 corresponding to virtual channel A of the low priority packet, the low priority packet is placed in element 423 corresponding to virtual channel A of the low priority packet in the pending queue 421.

For a cell in virtual channel B, if there is sufficient weight in the element 415 corresponding to virtual channel B of the low priority packet, the low priority packet is placed in element 415 corresponding to virtual channel B of the low priority packet in the active queue 411. If there is no longer sufficient weight in the element 415 corresponding to virtual channel B of the low priority packet, the low priority packet is placed in element 425 corresponding to virtual channel B of the low priority packet in the pending queue 425.

For a cell in virtual channel C, if there is sufficient weight in the element 417 corresponding to virtual channel C of the low priority packet, the low priority packet is placed in element 417 corresponding to virtual channel C of the low priority packet in the active queue 411. If there is no longer sufficient weight in the element 417 corresponding to virtual channel C of the low priority packet, the low priority packet is placed in element 427 corresponding to virtual channel C of the low priority packet in the pending queue 427.

A system scheduler takes packets for transmission from high priority queue 401 and in deficit round robin fashion from active queue 411. According to various embodiments, when active queue 411 is empty, the pending queue 421 becomes active queue 411.

According to various embodiments, virtual paths are also supported using a virtual path queue. Whenever there is traffic on the virtual path queue then a cell is placed onto the virtual path calendar at the appropriate time in the future. The two queues for a given virtual path are serviced in priority order. Once the cell from the virtual path comes off of the virtual path calendar, it is sent out the port.

Figure 5:
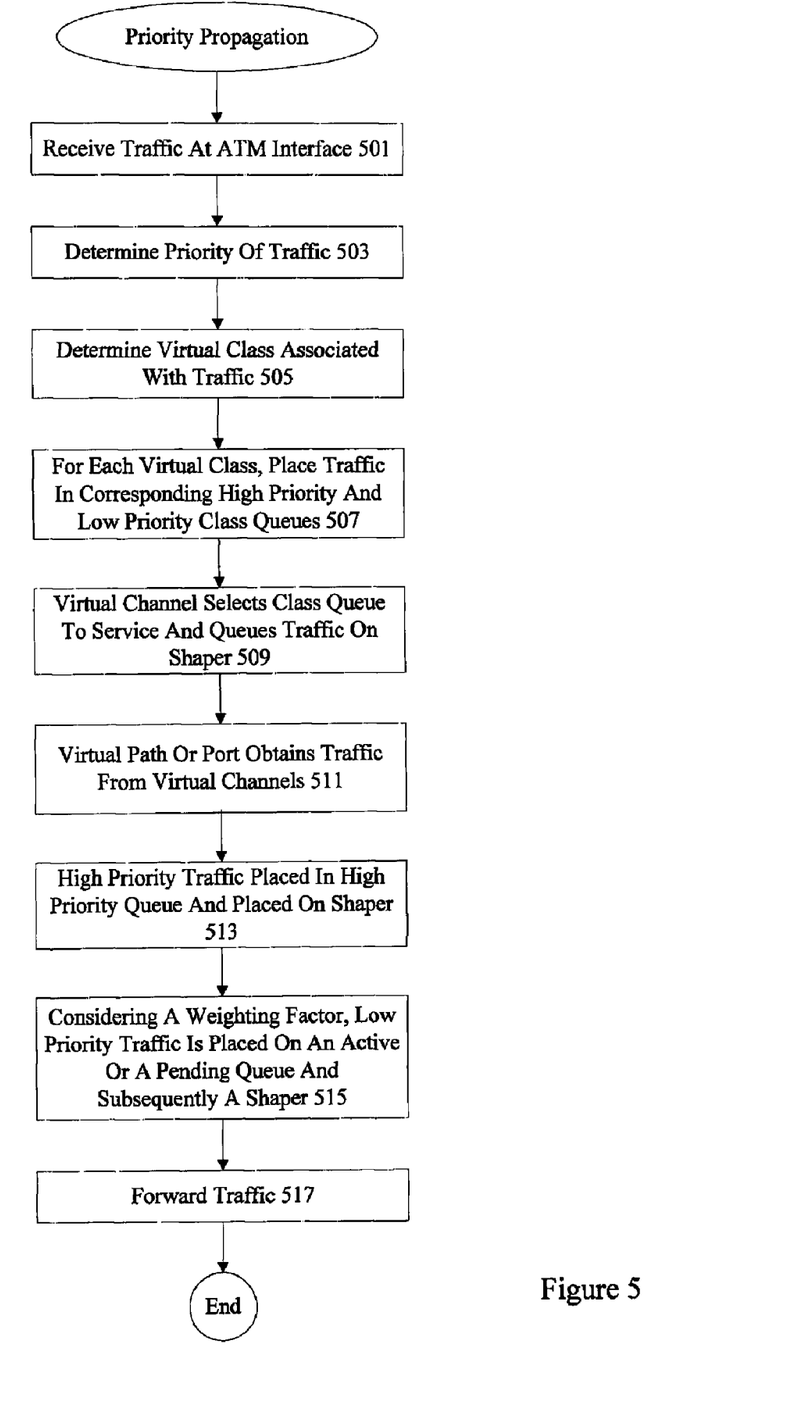
FIG. 5 illustrates a particular example of a technique for priority propagation.

FIG. 5 illustrates one example of priority propagation. At 501, an ATM interfaces receives traffic. The traffic may be associated with a virtual channel and/or a virtual path. A variety of information may be encapsulated in ATM cells. In particular example embodiments, the system determines traffic priority at 503 and the virtual class at 505. According to various embodiments, traffic is queued in high priority and low priority class queues for each virtual class at 507. At 509, the virtual channel selects a class queue to service. According to particular embodiments, the virtual channel selects the class queue to service using deficit round robin. Cells from the virtual channel class queues are added to an ATM scoreboard/calendar in an appropriate timeslot based on the virtual channel's future eligibility. The virtual path or port obtains traffic from one or more virtual channels at 511. At 513, high priority traffic is obtained from one or more virtual channels at and placed on a shaper. At 515, low priority traffic is placed either on an active queue or a pending queue depending on a weighting factor and subsequently placed on a shaper. According to various embodiments, if a weighting factor reaches zero, the share of bandwidth for that virtual channel is exhausted and the cell is placed in a pending queue.

Figure 6:
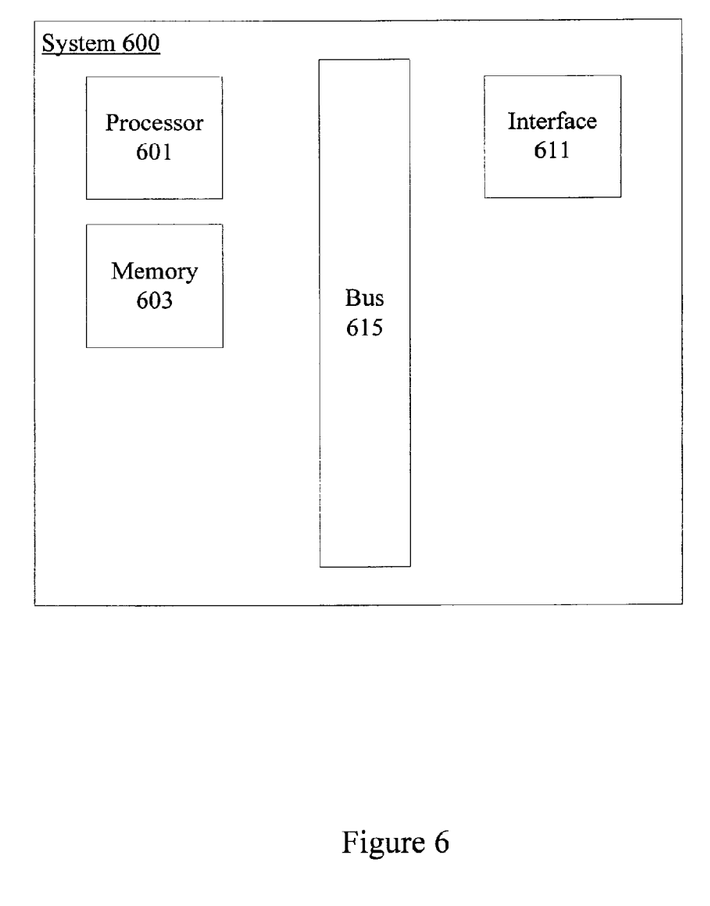
FIG. 6 illustrates a particular example of a network device.

A variety of devices and applications can implement particular examples of priority propagation. Server, routers, switches, line cards, can all use priority propagation. FIG. 6 illustrates one example of a device that can implement priority propagation.

According to particular example embodiments, a system 600 suitable for implementing particular embodiments of the present invention includes a processor 601, a memory 603, an interface 611, and a bus 615 (e.g., a PCI bus). When acting under the control of appropriate software or firmware, the processor 601 is responsible for such tasks such as encoding and decoding streams. Various specially configured devices can also be used in place of a processor 601 or in addition to processor 601. The interface 611 is typically configured to send and/or receive data packets or data segments over a network. Particular examples of interfaces include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions. The program instructions may control the operation of an operating system and/or one or more applications, for example. The memory or memories may also be configured to store received packets, bindings, Keep-Alive states, periodicity information for monitored session packets, Flow-Through and/or Flow-Around configurations, etc.

Because such information and program instructions may be employed to implement the systems/methods described herein, the present invention relates to tangible, machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

The invention claimed is:

1. A method, comprising:
obtaining high priority traffic from one of a plurality of virtual channels servicing high priority traffic in a virtual circuit network, each virtual channel associated with a channel priority class;
placing the high priority traffic in a high priority queue;
obtaining low priority traffic from a plurality of virtual channels in the virtual circuit network;
wherein the high priority traffic and the low priority traffic comprise a plurality of cells, each of the plurality of cells having a corresponding cell priority;
determining a weighting value associated with cells of the low priority traffic, the weighted value corresponding to a channel priority class of the virtual channel associated with the low priority traffic, wherein cells of the low priority traffic are placed either in a low priority traffic active queue or a low priority traffic pending queue based on the weighting value.

2. The method of claim 1, wherein high priority traffic is placed in the high priority queue associated with a virtual path.

3. The method of claim 1, wherein high priority traffic is placed in the high priority queue associated with a port.

4. The method of claim 1, wherein high priority traffic is forwarded at a virtual path level.

5. The method of claim 1, wherein low priority traffic is forwarded at the virtual path level using deficit round robin.

6. The method of claim 1, wherein high priority traffic is placed in a high priority queue associated with a virtual channel.

7. The method of claim 6, wherein low priority traffic is placed in a low priority queue associated with the virtual channel.

8. The method of claim 6, wherein the virtual channel services either the high priority queue or the low priority queue based on deficit round robin scheduling.

9. The method of claim 1, further comprising placing the low priority traffic on an ATM calendar before placing the low priority traffic in the low priority active queue.

10. The method of claim 1, further comprising placing the high priority traffic on an ATM calendar before placing the low priority traffic in the low priority active queue.

11. The method of claim 10, further comprising determining that the low priority active queue is empty.

12. The method of claim 11, further comprising switching the low priority pending queue to be the low priority active queue.

13. A system, comprising:
a processor connected to memory, the processor operable to obtain high priority traffic from one of a plurality of virtual channels servicing high priority traffic in a virtual circuit network and place the high priority traffic in a high priority queue, wherein each virtual channel is associated with a channel priority class, the processor further operable to obtain low priority traffic from one of a plurality of virtual channels in the virtual circuit network, wherein the high priority traffic and the low priority traffic comprise a plurality of cells, each of the plurality of cells having a corresponding cell priority, and determine a weighting value associated with cells of the low priority traffic, the weighted value corresponding to a channel priority class of the virtual channel associated with the low priority traffic, wherein cells of the low priority traffic is placed either in a low priority traffic active queue or a low priority traffic pending queue based on the weighting value.

14. The system of claim 13, wherein high priority traffic is placed in the high priority queue associated with a virtual path.

15. The system of claim 13, wherein high priority traffic is placed in the high priority queue associated with a port.

16. The system of claim 13, wherein high priority traffic is forwarded at a virtual path level.

17. The system of claim 13, wherein low priority traffic is forwarded at the virtual path level using deficit round robin.

18. The system of claim 13, wherein high priority traffic is placed in a high priority queue associated with a virtual channel.

19. The system of claim 18, wherein low priority traffic is placed in a low priority queue associated with the virtual channel.

20. An apparatus, comprising:

means for obtaining high priority traffic from one of a plurality of virtual channels servicing high priority traffic in a virtual circuit network, each virtual channel associated with a channel priority class;

means for placing the high priority traffic in a high priority queue;

means for obtaining low priority traffic from a plurality of virtual channels in the virtual circuit network;

wherein the high priority traffic and the low priority traffic comprise a plurality of cells, each of the plurality of cells having a corresponding cell priority;

determining a weighting value associated with cells of the low priority traffic, the weighted value corresponding to a channel priority class of the virtual channel associated with the low priority traffic, wherein cells of the low priority traffic are placed either in a low priority traffic active queue or a low priority traffic pending queue based on the weighting value.

* * * * *